Jan. 10, 1967   C. E. FORNEY   3,297,126
METHOD AND APPARATUS FOR PULLING CONVEYOR BELTING
Filed Feb. 11, 1965   2 Sheets-Sheet 1

INVENTOR.
CLAIR E. FORNEY

BY *Wynne & Tinken*
ATTORNEYS.

Jan. 10, 1967  C. E. FORNEY  3,297,126
METHOD AND APPARATUS FOR PULLING CONVEYOR BELTING
Filed Feb. 11, 1965  2 Sheets-Sheet 2
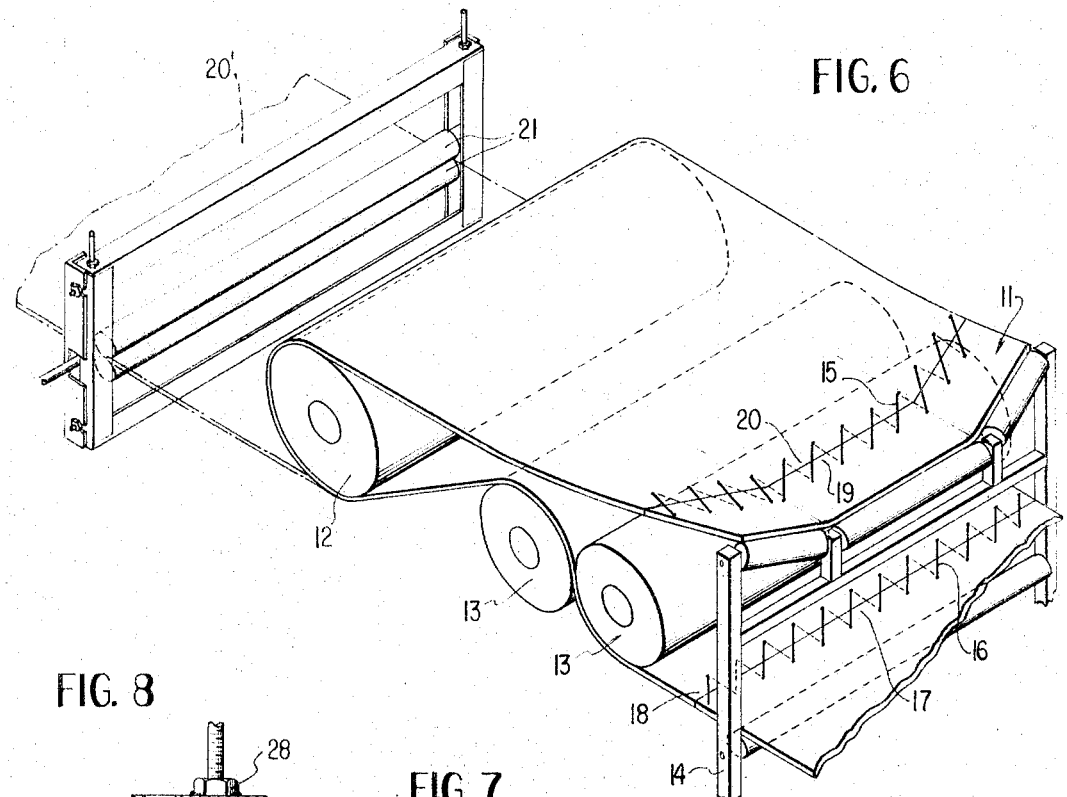
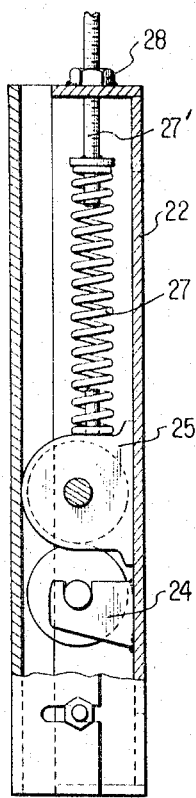
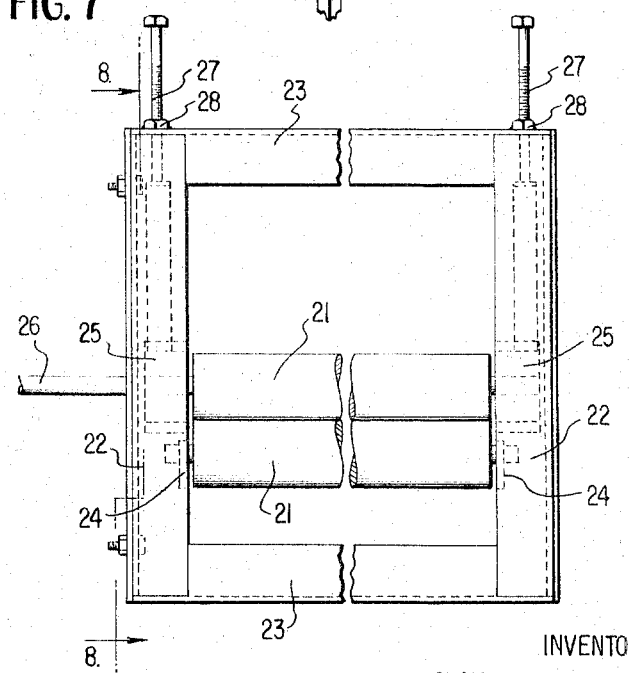
INVENTOR.
CLAIR E. FORNEY
BY *Wynne & Finken*
ATTORNEYS 3,297,126
METHOD AND APPARATUS FOR PULLING
CONVEYOR BELTING
Clair E. Forney, R.D. 1, Saltsburg, Pa. 15681
Filed Feb. 11, 1965, Ser. No. 431,842
5 Claims. (Cl. 198—1)

This invention relates to belt conveyors and particularly to a method and apparatus for pulling or retracting belting from such conveyors.

The use of troughed flexible belt conveyors in mines and the like is well known. Such conveyors often extend several thousand feet and on many occasions belting must be removed therefrom as when the conveyor is shortened, such as when new faces of a mine are to be worked. On other occasions, the conveyor must be disassembled for removal to a new site, first necessitating removal of the belt. The task of pulling or retracting a conveyor belt has been tedious and time-consuming in the past, requiring the expenditure of much manual labor under adverse working conditions in narrow, low overhead tunnels.

It is the principal object of this invention to provide an improved method and system for pulling conveyor belting which requires far less manpower and time than the prior art methods and systems. Another object is to provide a method and apparatus for pulling belt which is simple and safe to operate. It is another object of this invention to employ power tensioning means to enable the pulling of belting, the power source being readily available in mines. A further object is to provide a system for removing conveyor belting which enables the transporting of conveyor structure on the conveyor from which belting is being removed. Additionally, the method and apparatus of the invention may be utilized with a variety of conveyor systems without modification. Other objects and advantages will be apparent to those skilled in the art from the detailed description herein.

The prior art method in general use of pulling a belt in the shortening of a flexible belt conveyor involves first breaking the belt by opening the belt lacing on the conveying reach at a point adjacent the head or discharge end of the conveyor. The belt on the conveying reach is then pinched or otherwise held against movement at the end adjacent the separated lacing. After a number of stands or troughing roller supports are removed from the conveyor end adjacent the tail section, the free end of the belt extending on the bottom or return reach is pulled manually to maintain the belt under tension at the belt drive wheels. Because the belt is difficult to grip, clamps are usually applied to it which are pulled manually. The drive wheels are then driven in reverse to pull the belt therethrough. Because the drive wheels will pull the belt only when sufficient tension is applied to the belt by the workmen, and because handling of the belt is difficult in the limited space normally available, it is apparent that only a short increment of belt can be pulled before the workmen must move the clamps and reposition themselves to pull on a fresh portion of the belt. It is apparent that tedious manual handling of the belt is involved in this method and that the retraction of long lengths of belt involves a great many handlings and consumes much time.

The method of this invention involves removing a number of belt supports from adjacent the tail end, separating the belt transversely of its length at a lacing adjacent the head end securing the end of the belt extending from the return reach against movement, operatively engaging the conveying reach of the belt with the drive means and producing increased driving engagement of the belt with the drive means whereby the conveying reach is pulled. The increased driving engagement of the belt with the drive means is accomplished by tensioning the belt to obtain increased driving friction between the belt and the drive means. According to a preferred embodiment, the tensioning is accomplished with power driven tensioning rolls, the power being supplied from sources readily available.

It is apparent that if the belt is broken by unlacing at one point, engaging the conveyor reach end with the drive means involves rethreading the belt through the drive means. While this may be accomplished, it is often difficult and it is preferred that it be avoided. Accordingly, it is preferred that the belt be separated at two points, one on the conveying reach and one on the return reach. The belt is then reassembled in such fashion as to engage the conveying reach with the belt in engagement with the drive means.

Conveyor belting is normally produced in predetermined lengths which are laced together to form an endless belt. Accordingly, the separation of the belt may be simply accomplished at one or more points at the lacing.

The pulling of belting from a conveyor requires considerably more driving force than the operation of a normal conveyor even when fully loaded, largely because of the friction created by the belt reaches being in contact with each other at the section from which the belt supports have been removed. The method and apparatus of the invention maintain a controllable tension on the belt whereby the conveyor drive means is enabled to pull the belt therefrom.

The system and method of the invention may be utilized with a variety of endless belt conveyor systems which employ an upper conveying reach, a lower return reach, a plurality of belt supports, usually troughing rollers, a head end having power drive means and a tail end.

In the preferred method of the present invention, the belt is broken by opening the lacing on the return reach of the belt at a point adjacent the head end of the conveyor. The free end of the return reach is gripped or pinched to secure it against movement. The belt is also broken on the conveying reach by unlacing at a point near the head end, and the other free end of the lower reach adjacent the drive rolls is laced to the belt on the conveying reach. The end of the key section passing between the drive rolls is then passed between a pair of driven rollers of the invention which maintain tension on the belt to enable the drive rollers when driven in reverse direction to retract the belt. Troughing roller supports or stands are removed from the tail end of the conveyor as in the prior art method. In this method, lengthy sections of belt may be pulled at each stage, the only manual labor required at the head end being to orient the belt as it piles upon itself coming off the conveyor.

The method and apparatus of the invention will be further apparent from the drawings, in which:

FIG. 6 is a perspective view, in part schematic, at the head end of a belt conveyor and the associated tensioning rolls of the invention about to be set up for retracting the belt.

FIG. 7 is a view in elevation of the driven tensioning rolls of the invention.

FIG. 8 is a sectional view taken along lines 8—8 of FIG. 7.

Figure 1:
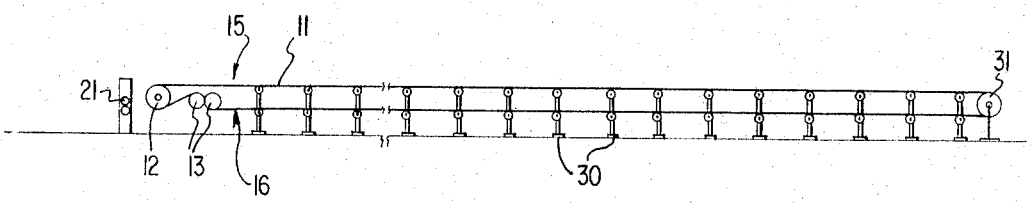
FIG. 1 is a schematic representation of a flexible belt conveyor.

Referring first to FIGS. 1 and 6, the head end of a belt conveyor is shown, the belt identified at 11, the head roller at 12, the bull wheels or drive rollers at 13 and the troughing roller stand or support at 14. As the first step in the belt pulling method of the invention, it is preferred that the first stand 14 immediately adjacent the head end be removed in order to secure working room. The belt is broken on the conveying reach by unlacing as at the point 15. The belt is also broken on the lower or return reach by unlacing as at the point 16. The end 17 on the return reach is clamped or pinched to secure it against movement by a pinch board (not shown) well known in the art. This is shown schematically in FIG. 2 at 17. The other end 18 of the lower reach is then laced to the end 19 of the conveying reach. The free end 20 or key section of the belt on the conveying reach is then pulled off the head roller 12 and passed between a pair of tensioning rollers 21 to be more fully described. The belt end 20 is shown as 20' in FIG. 6 in dotted lines passing between the tensioning rollers 21. The resulting belt configuration is shown at the left side of FIG. 2.

The tensioning roller structure is illustrated in FIGS. 7 and 8. A supporting frame structure is provided having vertical frame members 22 and transverse frame members 23 secured thereto. Vertical frame members 22 carry fixed lower bearings 24 rotatably supporting lower roller 21. Upper bearings 25 are vertically slidably carried by the vertical frame members 22 and upper roller 21 is rotatably supported thereby. A drive shaft 26 is keyed to upper roller 21 and extends outwardly from the frame. A pair of compression springs 27 is provided to provide clamping pressure between the rollers, adjustment of the pressure being facilitated by screw means 27' threaded through the nut means 28 secured to the upper frame 23.

In use, the end of the belt is passed between the rollers 21, the belt clamped therebetween by tightening the screw means 27 sufficient to prevent slipping of the belt with respect to the rollers and rotating power means connected to the drive shaft 26. A preferred source of power is a mine drill, readily available in mines and other locations where such conveyors are in use. The pulling effect of the rolls 21 exerts tension on the belt whereby the conveyor drive rollers 13, driven in the reverse direction from normal, pull the belt. The tensioning roller assembly is provided with suitable means (not shown) to fix it in position such as mine jacks to engage a mine tunnel roof, means for supporting it from roof timbers, or the like.

Referring to FIGS. 1–5, the conveyor belt reaches are supported by a plurality of spaced roller supports 30, the conveying reach supported by troughing roller assemblies and the return reach by straight rollers. The supports 30 illustrated are intended to be schematic only both as to their number and structure, for the invention is equally applicable to conveyors having wire rope side frames, individual troughing roller stands, and other roller supporting frames. The tail roller 31 is shown schematically, and in most cases such assembly is mounted on wheels or skids to facilitate movement thereof.

Figure 2:
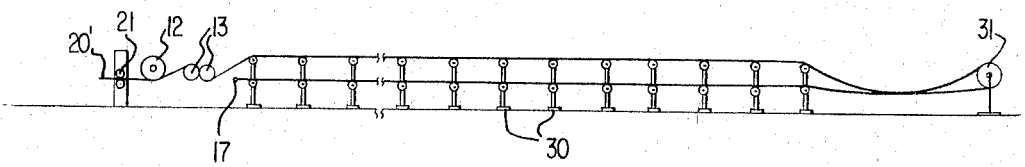
FIG. 2 is a schematic representation of the conveyor with the belt in position to be pulled and with a number of roller supports removed from the tail section of the conveyor.
Figure 3:
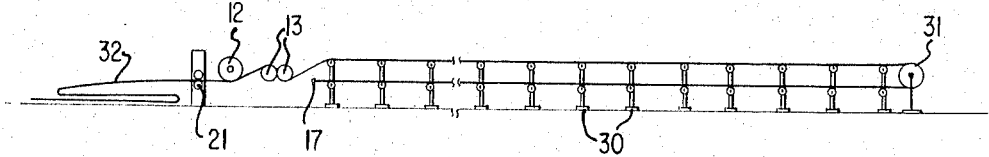
FIG. 3 is a schematic representation of the conveyor with a predetermined portion of the belt having been pulled.
Figure 4:
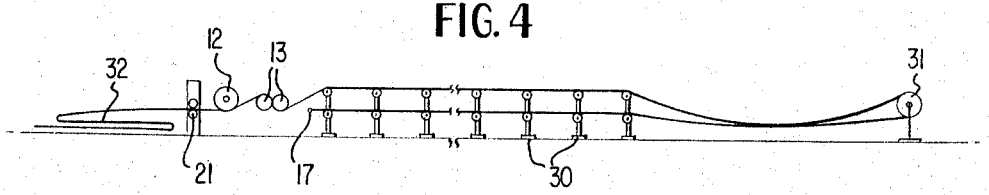
FIG. 4 is a schematic representation of the conveyor having additional roller supports removed before further belting is pulled, analogous to FIG. 2.
Figure 5:
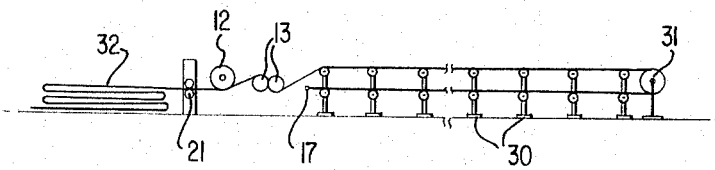
FIG. 5 is a schematic representation of the conveyor with a further amount of belting having been pulled, analogous to FIG. 3.

As previously pointed out, FIG. 1 illustrates a conveyor as in use, identifying the points at which the belt is to be broken for belt removal. FIG. 2 illustrates the belt in condition to be pulled, a plurality of roller supports having been removed from the tail end of the conveyor. FIG. 3 illustrates a length of belt having been pulled, the belting having been piled up as shown at 32. FIG. 4 is similar to FIG. 2, showing additional roller supports at the tail section having been removed. FIG. 5 is similar to FIG. 3, showing an additional length of belting having been pulled.

In practice, a few frames, at about every 80 feet or so, are preferably left in place at the tail end being pulled, to be removed as the tail section advances. This is to prevent the belt from dragging on the ground and increasing friction and avoids damage to the belt. It is to be noted that during the pulling operation, the conveying reach travels in the same direction as when the conveyor is in use. This permits the use of the conveyor itself for conveying supporting framework structure, etc., such material being placed on the belt where supporting frames still support it. This is an important advantage, for in the conventional prior art pulling operation, the conveyor reach is stationary, the belt being pulled from the lower reach.

In the actual use of the method and apparatus of the invention, two men at the head end of the conveyor have pulled 350 feet of 30-inch wide, half-inch thick neoprene belting in five minutes, the supporting framework at the tail end having been previously removed. One man handled a coal mine drill coupled to the tensioning rollers and the other guided the belt to pile it up. In contrast to this, the prior art method required 8 men four hours to pull 350 feet of the same belting, utilizing clamps to grip the belt for tensioning the same and pulling increments of only two feet at a time.

While the invention has been illustrated and described in terms of certain preferred embodiments, they are to be considered illustrative rather than limiting, and it is intended to cover all further modifications that fall within the spirit and scope of the appended claims.

I claim:

1. The method of removing belting from an endless flexible belt conveyor which has an upper conveying reach, a lower return reach, a plurality of belt supports, a head end having power drive means and a tail end comprising the steps of removing a number of belt supports from adjacent the tail end, separating the belt transversely of its length adjacent the head end to provide two belt ends, securing the end of the belt extending from the return reach against movement, operatively engaging the conveying reach of the belt with the drive means, driving the drive means, and producing increased driving engagement of the belt with the drive means whereby the conveying reach and the tail end are pulled thereby.

2. The method as set forth in claim 1 wherein said increased driving engagement of the belt with the drive means is produced by tensioning the end of the belt extending from the conveying reach whereby increased driving friction is obtained between the belt and the drive means.

3. The method as set forth in claim 2 wherein the tensioning is accomplished by maintaining driving force between a drive roll and an idler roll compressing the belt therebetween.

4. In the method of removing belting from an endless flexible belt conveyor which has an upper conveying reach, a lower return reach, a plurality of belt supports, a head end having power drive means and a tail end comprising the steps of removing a number of belt supports from adjacent the tail end, separating the belt transversely of its length on the return reach adjacent the head end to provide two belt ends, securing the end of the belt extending from the return reach against movement, separating the belt transversely of its length on the conveying reach adjacent the head end to provide two belt ends, connecting the end of the belt extending from the conveying reach to the free end of the belt of the return reach, passing the free end of the belt of the conveying reach between a pair of tensioning rollers, driving the drive means, and driving the tensioning rollers to increase the driving engagement of the belt with the drive means whereby the conveying reach and the tail end are pulled thereby.

5. In an endless flexible belt conveyor which has an upper conveying reach, a lower return reach, a plurality of belt supports, a head end having power drive means receiving said belting and a tail end, means in combination with said power drive means comprising a tensioning device for receiving belting and facilitating the removal thereof from the conveyor comprising a pair of vertical support members, lower bearing means carried by each of said supports, a lower roller rotatably carried by said lower bearing means, upper bearing means movably carried by each of said supports, an upper roller rotatably carried by said upper bearing means, means for adjustably moving the upper and lower rollers in contact, and driving means on one of said rollers for coupling to a rotating power source.

References Cited by the Examiner

UNITED STATES PATENTS

| | | | |
|---|---|---|---|
| 840,446 | 1/1907 | Ertheiler | 198—184 |
| 2,306,448 | 12/1942 | Kratz | 198—208 |
| 2,413,339 | 12/1946 | Stadelman | 198—203 |
| 2,576,217 | 11/1951 | Eggleston | 198—139 |
| 3,217,863 | 11/1965 | Duncan | 198—203 |

EVON C. BLUNK, *Primary Examiner.*

RICHARD E. AEGERTER, *Examiner.*